United States Patent [19]

Nakajima

[11] Patent Number: 5,189,462
[45] Date of Patent: Feb. 23, 1993

[54] RANGE METER FOR CAMERA
[75] Inventor: Yuji Nakajima, Chiba, Japan
[73] Assignee: Seikosha Co., Ltd., Tokyo, Japan
[21] Appl. No.: 891,676
[22] Filed: May 28, 1992

Related U.S. Application Data

[63] Continuation of Ser. No. 634,260, Dec. 26, 1990.

[30] Foreign Application Priority Data

Dec. 27, 1989 [JP] Japan ................ 1-339421

[51] Int. Cl.⁵ .................................. G03B 13/36
[52] U.S. Cl. .................................. 354/403; 354/409; 356/1
[58] Field of Search .................... 354/403, 409; 356/1

[56] References Cited

U.S. PATENT DOCUMENTS

| | | |
|---|---|---|
| 4,740,806 | 4/1988 | Takehana . |
| 4,827,303 | 5/1989 | Tsuboi ................ 354/403 |
| 4,908,648 | 5/1990 | Sawabe et al. .......... 354/403 |
| 4,954,861 | 9/1990 | Nagaoka et al. . |
| 4,962,400 | 10/1990 | Otani et al. ........... 354/403 |
| 4,983,033 | 1/1991 | Suzuki ................ 354/403 |

FOREIGN PATENT DOCUMENTS 1203091 8/1970 United Kingdom .
2219709 12/1989 United Kingdom .

*Primary Examiner*—Russell E. Adams
*Attorney, Agent, or Firm*—Jordan and Hamburg

[57] ABSTRACT

A distance measuring system for a camera includes a plurality of light sources arranged in a row, and a receiver for receiving light reflected from a subject. The receiver outputs a signal corresponding to the position thereon at which light is received, and is a function of the direction of propogation of the light from its source and the distance to the object. The distance to the subject is calculated from the output of the receiver. The sources are selectively energized by manual control so that the system is adaptable for measurement in a plurality of different distance ranges. A display may be provided to mark a spot on an image of the subject, to enable the user to determine the subject that had been used for the distance determination.

9 Claims, 3 Drawing Sheets

RANGE METER FOR CAMERA

This application is a continuation, of application Ser. No. 07/634,260, filed Dec. 26, 1990.

FIELD OF THE INVENTION

This invention relates to a range meter for cameras.

BACKGROUND OF THE INVENTION

In automatic focusing (AF type) cameras, generally, the distance to a subject to be photographed is measured by triangulation.

In this method, an infrared beam is projected from a light projecting element toward the subject, the reflected light from the subject is received by a light receiving element, and the distance to the subject is calculated on the basis of the point of the light receiving element at which light is received.

In such a method, wherein only one light projecting element is used, however, it is difficult to obtain a correct distance unless the subject to be photographed is positioned at the center of a finder. In view of such circumstances, a so-called multi automatic focusing (multi AF type) range meter is also known (see, for example, Japanese Patent Laid-Open No. 87-223734) which uses a plurality of light projecting elements. In this multi AF type range meter, a plurality of subjects distributed in different directions are irradiated by the light projecting elements, the individual distances to the subjects are calculated, and the shortest one among them is chosen as a distance value.

Since a camera including the foregoing conventional multi AF type range meter is forcibly focused to the subject closest thereto, it is inconvenient where the desired subject is not the closest subject to the camera.

SUMMARY OF THE INVENTION

It is an object of the present invention to provide a range meter for a multi AF type camera by which focusing can be made to a desired subject even when that subject is not the closes subject to the camera.

BRIEF DESCRIPTION OF THE DRAWINGS

An embodiment of the invention will now be described with reference to the accompanying drawings, wherein.

DESCRIPTION OF THE PREFERRED EMBODIMENTS

Figure 1:
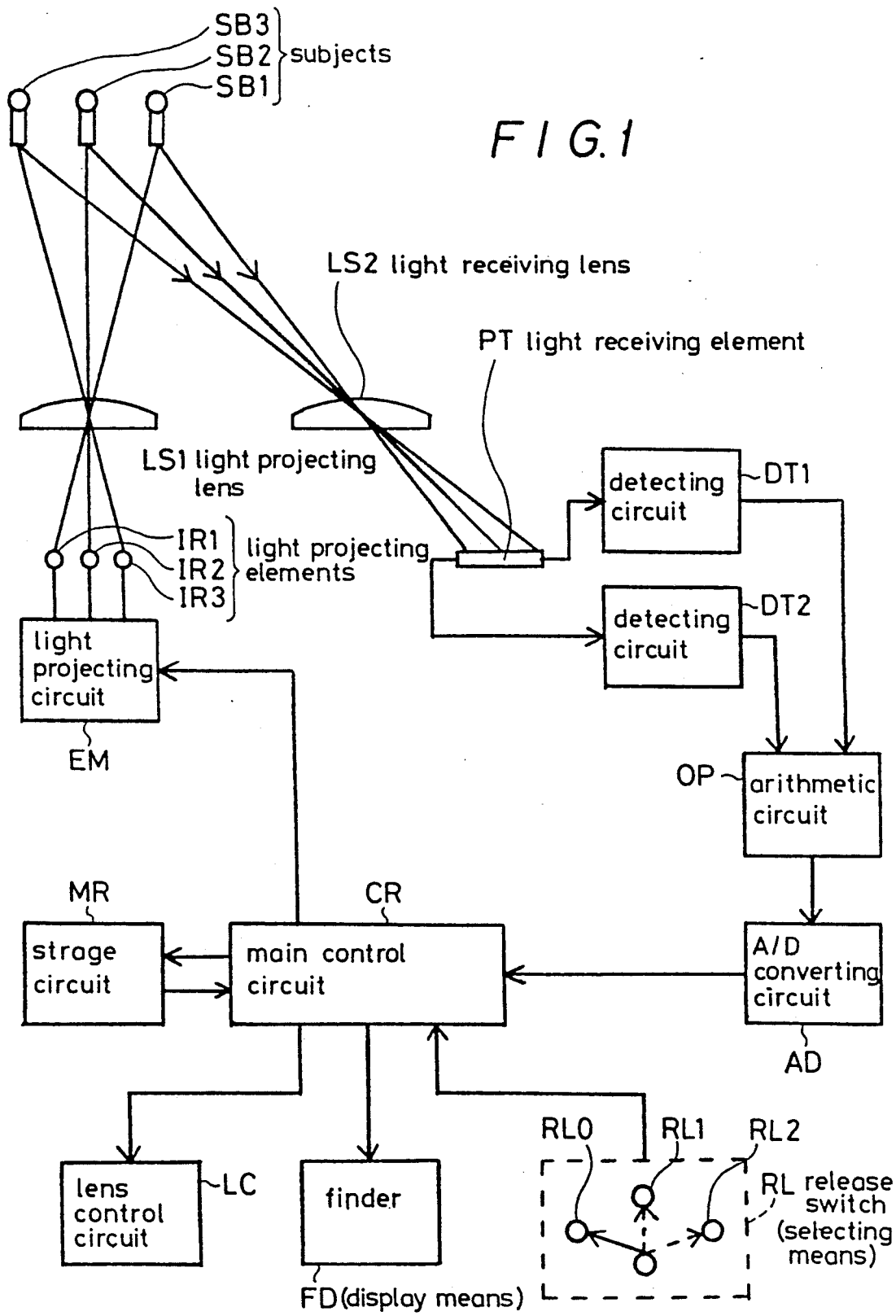
FIG. 1 is a block diagram showing an embodiment of the invention.

Individual components will be first described with reference to FIG. 1.

IR1, IR2 and IR3 are light projecting elements each of a light emitting diode for emitting far infrared light. These light projecting elements IR1, IR2, and IR3 are arranged in a row in front of a camera (not shown).

LS1 is a light projecting lens for projecting the light from each of the light projecting elements IR1, IR2 and IR3 to form corresponding irradiation beams traveling in different directions.

The light projecting elements IR1, IR2, and IR3 and the light projecting lens LS1 constitute light projecting means.

EM is a light projecting circuit for controlling the light emission of the light projecting elements IR1, IR2, and IR3.

PT is a light receiving element of a plurality of photodiodes which receives the reflected light from each of subjects SB1, SB2, and SB3 to be photographed, to provide an output signal corresponding to the point in its longitudinal direction at which light is received. This light receiving element PT is disposed in front of the camera.

LS2 is a light receiving lens for focusing the reflected light from each subject on the light receiving element PT.

DT1 and DT2 are detecting circuits for detecting the output signals of the light receiving element PT.

OP is an arithmetic circuit for providing an output signal corresponding to the distance to the subject on the basis of the output signals of the detecting circuits DT1 and DT2.

AD is an A/D converting circuit for converting the output signal of the arithmetic circuit OP from analog to digital form to provide a range value.

MR is a storage circuit made of a ROM (read-only memory). This storage circuit MR holds conversion coefficients used in converting the range value given from the A/D converting circuit AD into a real distance value.

CR is a main control circuit for controlling the whole system.

LC is a lens control circuit for controlling the position of the lens of the camera in response to the distance information from the main control circuit CR.

RL is a release switch acting as selecting means which is comprised of a push switch depressible in two stages. When depressed to the first stage, the release switch RL selects a switch terminal RL1 so that the distance to the subject is measured. When depressed to the second stage, it selects a switch terminal RL2 so that a shutter is opened to take a picture.

FD is a finder acting as display means. This finder FD has the function of displaying a focused spot in addition to the ordinary functions of the finder. Such a displaying function is attained by the use of a liquid crystal panel, for example.

Figure 2:
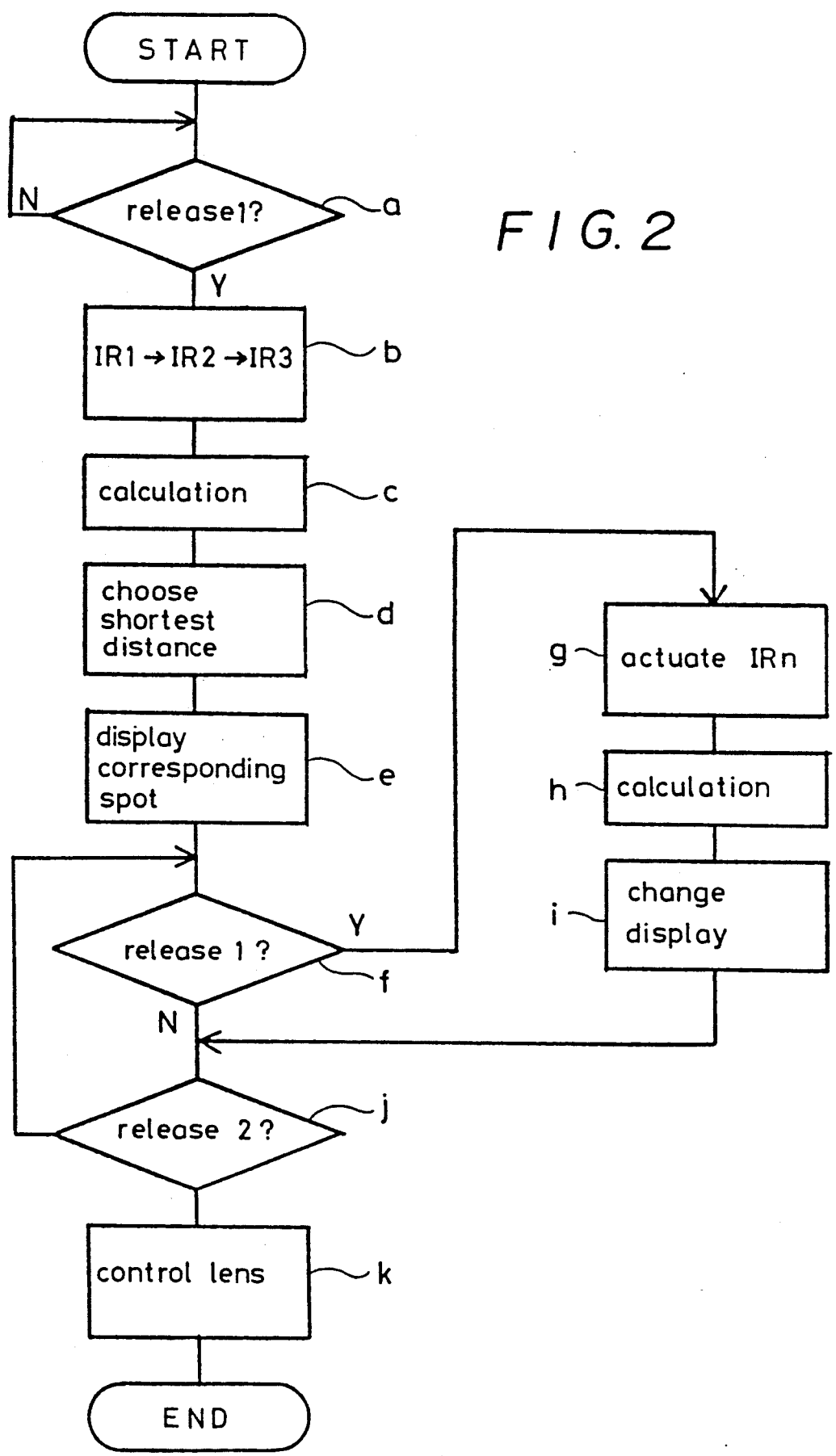
FIG. 2 is a flowchart showing the operation of the invention.

The operation of the invention will be described with reference to the flowchart of FIG. 2.

(a) When the release switch RL is depressed to the first stage, the switch terminal RL1 is selected to start a series of operations as follows.

(b) The light projecting circuit EM, upon receipt of a control signal from the main control circuit CR, causes the light projecting elements IR1, IR2, and IR3 to successively emit light in time-sharing manner. The irradiation beams from the light projecting elements IR1, IR2, and IR3 are successively reflected by the corresponding subjects SB1, SB2, and SB3, the individual reflected light being received by the light receiving element PT in succession. The light receiving element PT provides an output signal corresponding to each light-received point in its longitudinal direction, the output signal being detected by the detecting circuits DT1 and DT2.

(c) The arithmetic circuit OP successively processes the output signals of the detecting circuits DT1 and DT2. Each calculation result is converted in the A/D converting circuit AD from analog to digital form, each value in digital form being sent to the main control circuit CR in succession as a range value.

(d) The main control circuit CR chooses the smallest of the range values sent thereto. That is, the range value corresponding to the one of the subjects SB1, SB2, and SB3 that is positioned closest to the camera is chosen. The thus chosen range value is converted into a real distance value on the basis of the conversion data held in the storage circuit MR.

Figure 3:
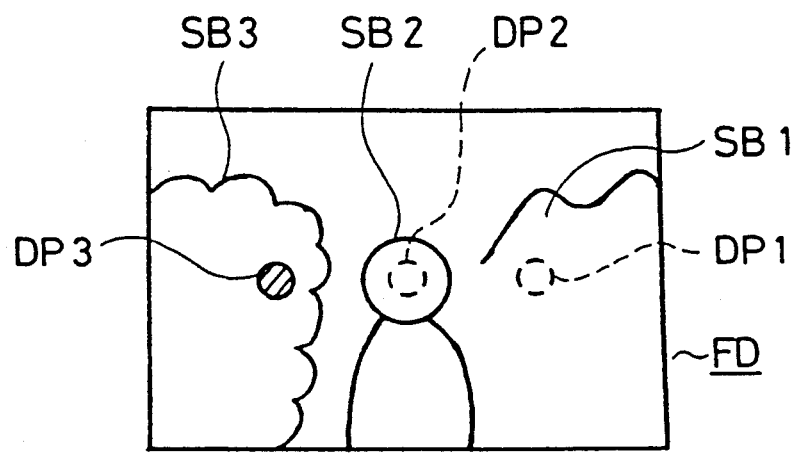
FIG. 3A and 3B are a set of views showing the operation of selecting subjects to be photographed.
Figure 3:
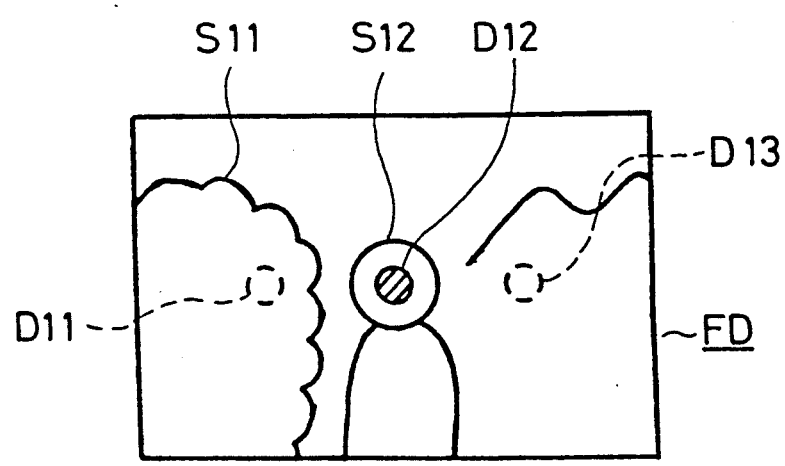

(e) FIG. 3 shows the finder as viewed at this time. For example, when the subject SB3 is positioned closest to the camera, a display pointer DP3 is displayed as illustrated in FIG.3(A).

When it is desired that focusing be made to either of the subjects SB2 or SB1 which is positioned more remote from the camera than the subject SB3, the following control is performed.

(f) After returning the release switch RL to its normal position RL0, the release switch RL is depressed to the first stage, so that the switch terminal RL1 is selected.

(g) As a result, the main control circuit CR sends a control signal to the light projecting circuit EM, so that the light projecting element IR2 emits light in response to the signal from the light projecting circuit EM.

(h) The irradiation beam from the light projecting element IR2 is reflected by the subject SB2, the reflected light being received by the light receiving element PT. The output signals of the light receiving element PT are detected by the detecting circuits DT1 and DT2, and after being processed, are converted from analog to digital form.

(i) The main control circuit CR converts the range value in digital form into the real distance value on the basis of the conversion data held in the storage circuit MR. In the finder, a display pointer DP2 is displayed as illustrated in FIG. 3(B).

When it is desired that focusing be made to the subject SB1, after returning the release switch RL again to its normal position RL0, the release switch RL is depressed to the first stage, so that the switch terminal RL1 is again selected at step (f). In this way, each time the switch terminal RL1 is selected, the light projecting elements IR1, IR2, and IR3 are cyclically selected one at a time, and correspondingly, the display pointers DP1, DP2, and DP3 are cyclically displayed one at a time.

(j) After a desired subject is selected in the foregoing manner, the release switch RL is depressed further to the second stage, so that the switch terminal RL2 is selected.

(k) When the switch terminal RL2 is selected, the lens control circuit LC controls the position of the lens of the camera on the basis of the distance value given from the main control circuit CR. Subsequently, the shutter is opened to take a picture.

In this way, the foregoing series of operations is performed when taking a picture.

The embodiment may be modified such that, with the release switch RL kept to the switch terminal RL1, the light projecting elements IR1, IR2, and IR3 as well as the display pointers DP1, DP2, and DP3 are successively selected one at a time automatically at time intervals of 1 to 2 seconds, and when the display pointer come to the position of a desired subject, the user controls the release switch RL to select the switch terminal RL2.

In the present invention, since a desired subject can be selected by manually selecting one out of the plurality of irradiation beams projected from the light projecting means, focusing can be reliably made to any desired subject.

Although the present invention has been described through specific terms, it should be noted here that the described embodiment is not necessarily exclusive and that various changes and modifications may be imparted thereto without departing from the scope of the invention which is limited solely by the appended claims.

What I claim is:

1. A range meter for cameras comprising light projecting means for projecting a plurality of irradiation beams in different directions, selecting means for manually selecting a desired one out of the plurality of the irradiation beams, light receiving means for receiving the reflected light from a subject to be photographed that is irradiated with the irradiation beam selected by the selecting means to provide an output signal corresponding to the position at which light is received on the light receiving means, and logic means for determining the distance to the subject on the basis of the output signal of the light receiving means.

2. A range meter for cameras according to claim 1, further including display means for providing a display corresponding to a spot irradiated with the irradiation beam selected by the selecting means.

3. The range meter of claim 1 wherein said selecting means comprises manually operable switch means.

4. The range meter of claim 3 wherein said selecting means comprises means responsive to sequential operation of said switch means for sequentially selecting said irradiation beams.

5. The range meter of claim 3 wherein said manual control means comprises means responsive to sequential operation of said switch means for selecting different ones of said irradiation beams.

6. A range meter for a camera comprising projecting means for projecting an irradiation beam toward a subject to be photographed, means for receiving reflected light responsive to reflection of said irradiation beam from a subject to be photographed, whereby the position at which light is received on said receiving means is a function of the direction that the beam of light is propagated and the distance between the projecting means and subject, said receiving means comprising means for providing an output that is a function of the position of said receiving means on which said reflected light is received, means coupled to said receiving means for determining said distance in response to the output of said receiving means, and manual control means for changing the direction at which an irradiation beam is propagated from said projecting means, whereby said range meter can selectively measure said distance in a plurality of different distance ranges.

7. The range meter of claim 6, wherein said projecting means comprises a plurality of light sources spaced apart in a row and arranged to direct their respective light beams through a lens from different directions, and said control means comprises means for selectively energizing said light sources.

8. The range meter of claim 6 further comprising a display means for displaying an image of said subject on said display, and means for displaying a mark on said display at a position corresponding to the position at which the irradiation beam is reflected from the subject.

9. The range meter of claim 6 wherein said manual control means comprises manually operable switch means.

* * * * *